United States Patent
Lin et al.

(10) Patent No.: US 8,499,188 B2
(45) Date of Patent: Jul. 30, 2013

(54) PROCESSING DEVICE FOR DETERMINING WHETHER TO OUTPUT A FIRST DATA USING A FIRST CLOCK SIGNAL OR A SECOND DATA USING DELAY FROM THE FIRST CLOCK SIGNAL ACCORDING TO A CONTROL SIGNAL

(75) Inventors: Chou-Kun Lin, Sanxia Township (TW); Tay-Jyi Lin, Daliao Township (TW); Pi-Cheng Hsiao, Taichung (TW); Yuan-Hua Chu, Jhubei (TW)

(73) Assignee: Industrial Technology Research Institute, Hsinchu (TW)

( * ) Notice: Subject to any disclaimer, the term of this patent is extended or adjusted under 35 U.S.C. 154(b) by 216 days.

(21) Appl. No.: 12/890,110

(22) Filed: Sep. 24, 2010

(65) Prior Publication Data

US 2011/0161719 A1 Jun. 30, 2011

(30) Foreign Application Priority Data

Dec. 31, 2009 (TW) .............................. 98146313 A

(51) Int. Cl.
*G06F 1/04* (2006.01)
*G06F 1/00* (2006.01)

(52) U.S. Cl.
USPC .......................................... 713/600; 713/500

(58) Field of Classification Search
USPC ........................................ 713/400, 500, 600
See application file for complete search history.

(56) References Cited

U.S. PATENT DOCUMENTS

| | | | |
|---|---|---|---|
| 4,701,915 A | 10/1987 | Kitamura | |
| 5,504,859 A | 4/1996 | Gustafson | |
| 5,649,174 A | 7/1997 | Dockser | |
| 5,990,811 A * | 11/1999 | Morimoto | 341/61 |
| 6,556,492 B2 | 4/2003 | Ernst et al. | |
| 6,647,467 B1 | 11/2003 | Dowling | |
| 6,868,503 B1 | 3/2005 | Maksimovic | |
| 7,065,169 B2 * | 6/2006 | Hartwell | 375/354 |
| 7,506,189 B1 | 3/2009 | Lee | |
| 2001/0009524 A1 * | 7/2001 | Koto | 365/201 |
| 2002/0046384 A1 * | 4/2002 | Hartwell | 714/791 |
| 2002/0070761 A1 * | 6/2002 | Abbiate et al. | 327/48 |
| 2003/0034809 A1 * | 2/2003 | Nakashima | 327/113 |
| 2006/0282692 A1 | 12/2006 | Oh | |
| 2009/0031155 A1 | 1/2009 | Hofmann | |

OTHER PUBLICATIONS

Shim, Reliable Low-Power Digital Signal Processing Via Reduced Precision Redundancy, IEEE Transactions on Very Large Scale Integration (VLSI) Systems, vol. 12, No. 5, pp. 497-510, May 2004.

* cited by examiner

*Primary Examiner* — Thomas Lee
*Assistant Examiner* — Phil Nguyen
(74) *Attorney, Agent, or Firm* — Wang Law Firm, Inc.; Li K. Wang; Stephen Hsu

(57) ABSTRACT

An embodiment of a processing device includes a function unit and a control unit. The function unit receives input data and performs a specific operation to the input data to generate result data. The control unit receives the result data and generates an output signal. The control unit latches the result data according to a first clock signal to generate first data and latches the result data according to a second clock signal to generate second data. The control unit compares the first data with the second data to generate a control signal and selects the first data or the second data to serve as data of the output signal according to the control signal. The second clock signal is delayed from the first clock signal by a predefined time period.

15 Claims, 5 Drawing Sheets

PROCESSING DEVICE FOR DETERMINING WHETHER TO OUTPUT A FIRST DATA USING A FIRST CLOCK SIGNAL OR A SECOND DATA USING DELAY FROM THE FIRST CLOCK SIGNAL ACCORDING TO A CONTROL SIGNAL

CROSS REFERENCE TO RELATED APPLICATIONS

This application claims the benefit of Taiwan application Serial No. 98146313 filed Dec. 31, 2009, the subject matter of which is incorporated herein by reference.

TECHNICAL FIELD

The invention relates to a processing device that can support variable-latency processing.

BACKGROUND

For portable electronics products, important considerations during product development are cost, weight, and battery service time. Low power techniques are heavily applied to extend the battery service time, among which lowering the operating voltage is the most efficient way to save power (and energy) due to the quadratic relationship between power and voltage. But the operating speed decreases significantly as the voltage scales down. Thus, to improve the performance for low operating voltages is an important issue.

State-of-the-art designs are synchronous, where all operations are synchronized with common clock signals, and the design verification, testing, and EDA methodologies are mature. However, the operating speed of synchronous designs depends on the slowest operation. In deep-submicron technologies, the delay variation of operations grow significantly, especially when the circuits are operated under low operating voltages.

The disclosed embodiments are directed to overcoming one or more of the problems set forth above.

SUMMARY

An exemplary embodiment of a processing device comprises a function unit and a control unit. The function unit receives input data and performs a specific operation to the input data to generate result data. The control unit receives the result data and generates an output signal. The control unit latches the result data according to a first clock signal to generate first data and latches the result data according to a second clock signal to generate second data. The control unit compares the first data with the second data to generate a control signal and selects the first data or the second data to serve as data of the output signal according to the control signal. The second clock signal is delayed from the first clock signal by a predefined time period.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments and, together with the description, serve to explain the principles of the invention.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
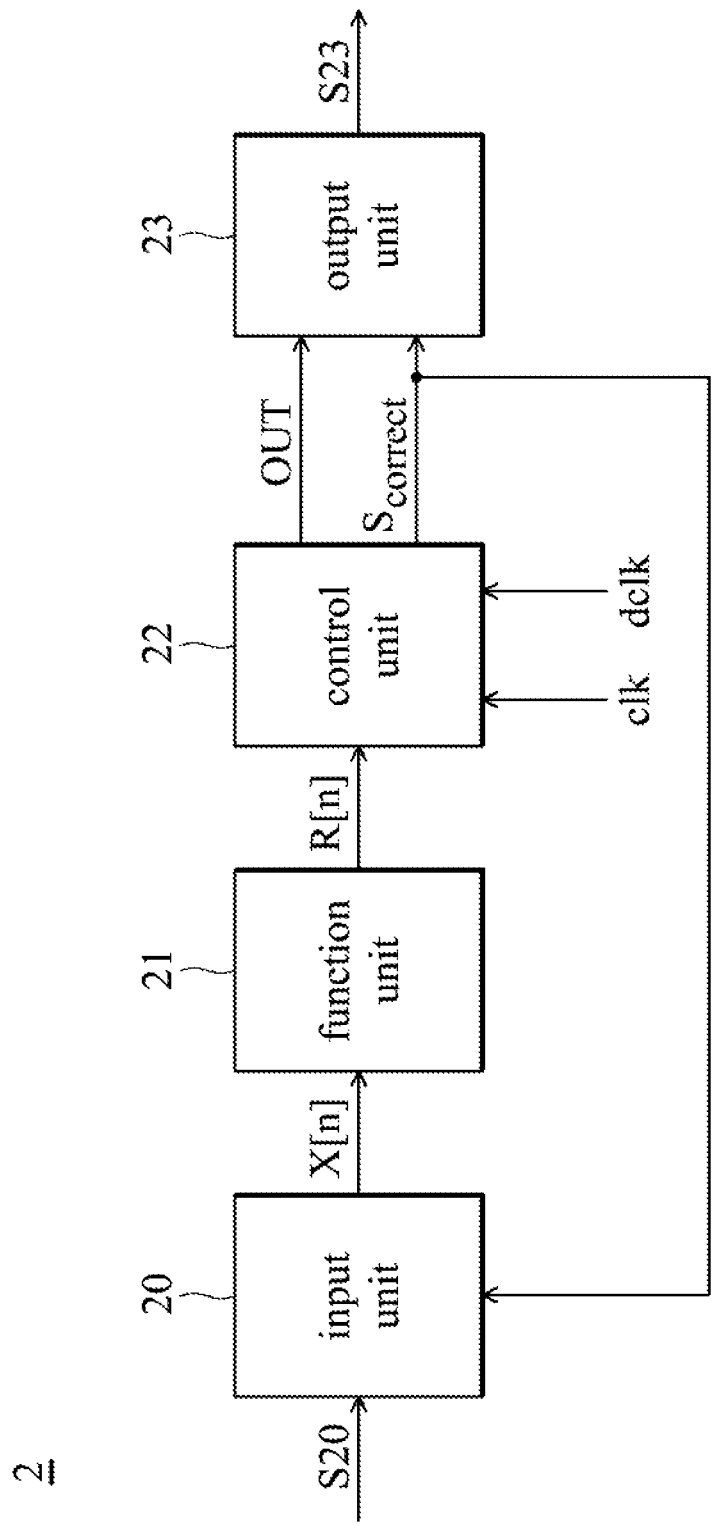
FIG. 1 shows an exemplary embodiment of a processing device.

Exemplary embodiments of processing devices are provided. In an exemplary embodiment of a processing device shown in FIG. 1, a processing device 1 is a variable-latency processing device. The processing device 1 comprises an input unit 20, a function unit 21, a control unit 22, and an output unit 23. The input unit 20 provides input data X[n]. The function unit 21 has the largest latency (such as 30 ns). The function unit 21 receives the input data X[n], wherein n is zero or positive integer. The function unit 21 performs a specific operation to the input data X[n] to generate result data R[n]. The control unit 22 receives the result data R[n] and latches the result data R[n] according to the a first clock signal clk to generate first data, which serves as output data of an output signal OUT. The first clock signal clk is an overclocking operation frequency for the function unit 21. For example, the cycle of the first clock signal clk is 20 ns. The control unit 22 further latches the result data R[n] according to a second clock signal dclk to generate second data. In the embodiment, the second clock signal dclk is delayed from the first clock signal clk by a predefined time period, and the sum of the predefined time period and the cycle of the first clock signal clk has be equal to or greater than the difference between the largest latency of the function unit 21 and the cycle of the first clock signal clk. For example, the predefined time period is 10 ns. Thus, the second data latched according to the second clock signal dclk is the correct operation result.

The control unit 22 compares the first data and the second data to generate a control signal $S_{correct}$. When the control unit 22 determines that the first data is identical to the second data, the first data latched by the control unit 22 according to the overclocking first clock signal clk is the correct operation result. At this time, the control unit 22 is controlled by the control signal $S_{correct}$ to continuously latch the next result data R[n] according to the first clock signal clk and generate the respective first and second data for comparison. When the control unit 22 determines that the first data is not identical to the second data, the first data latched by the control unit 22 according to the overclocking first clock signal clk is the incorrect operation result; that is, the output data of the output signal OUT generated according to the first data is incorrect. At this time, the control unit 22 corrects the output signal OUT according to the control signal $S_{correct}$. In the embodiment, the control unit 22 provides the second data to serve as the output data of the output signal OUT according to the control signal $S_{correct}$ for restoration. The output signal OUT is provided to the output unit 23.

Thus, when the processing device 2 operates according to the overclocking first clock signal clk, if the first data is a correct operation result, the control unit 22 performs the operation to the next result data R[n], and if the first data is the an incorrect operation result, the second data latched according to the delayed second clock signal dclk serves as the output data of the output signal OUT, so that the output signal OUT has a correct operation result. For simplicity, in the operation according to the overclocking first clock signal clk, if the output data of the output signal OUT is incorrect, the control unit 22 corrects the output signal OUT. Thus, the processing device 2 can operate with a low operation voltage and by the overlocking first clock signal clk, enhancing performance of the processing device 1. Moreover, when the incorrect operation result occurs, the operation result can be corrected.

Figure 2:
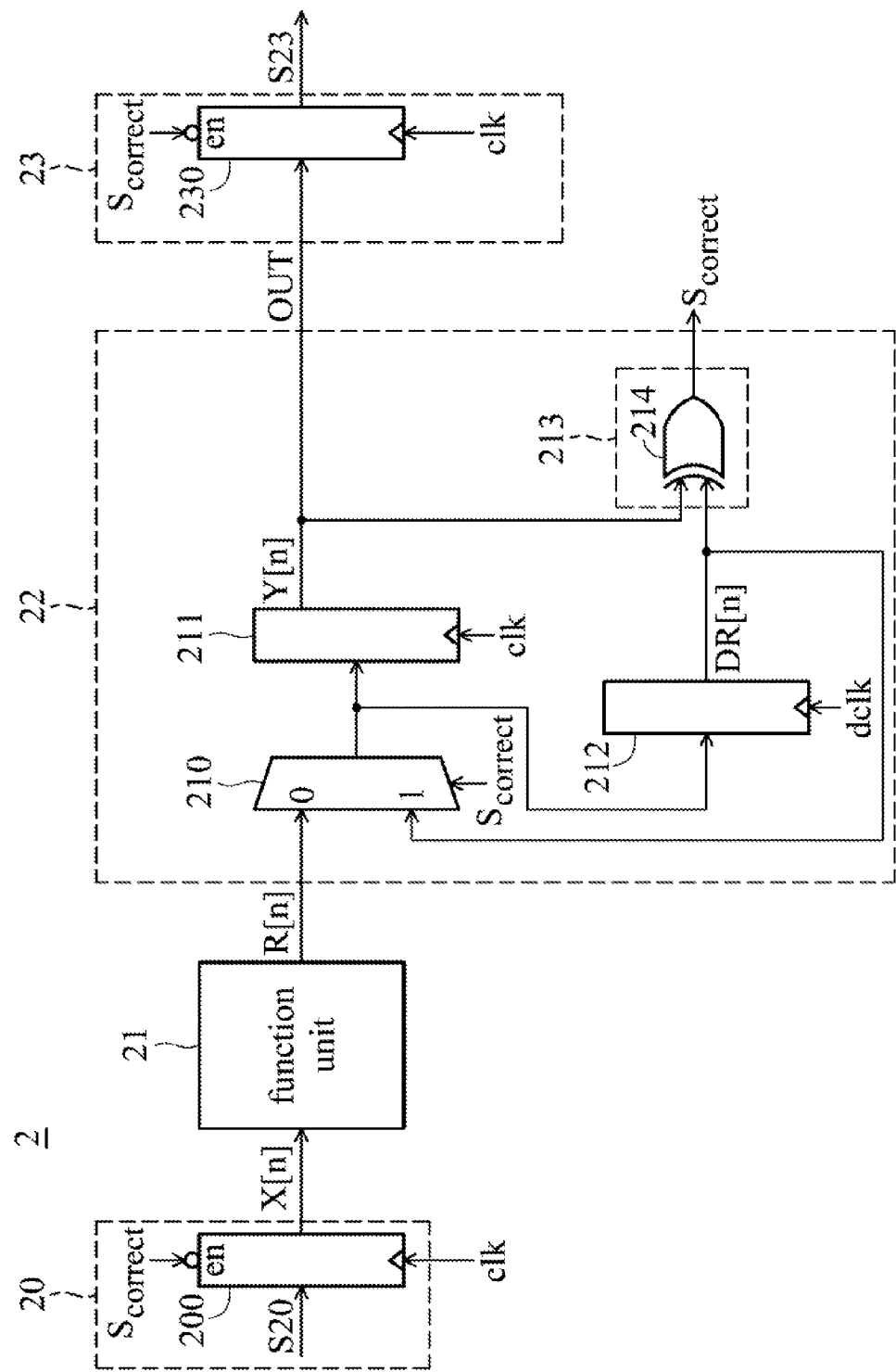
FIG. 2 shows an exemplary embodiment of a detailed circuit of the processing device in FIG. 1.
Figure 3:
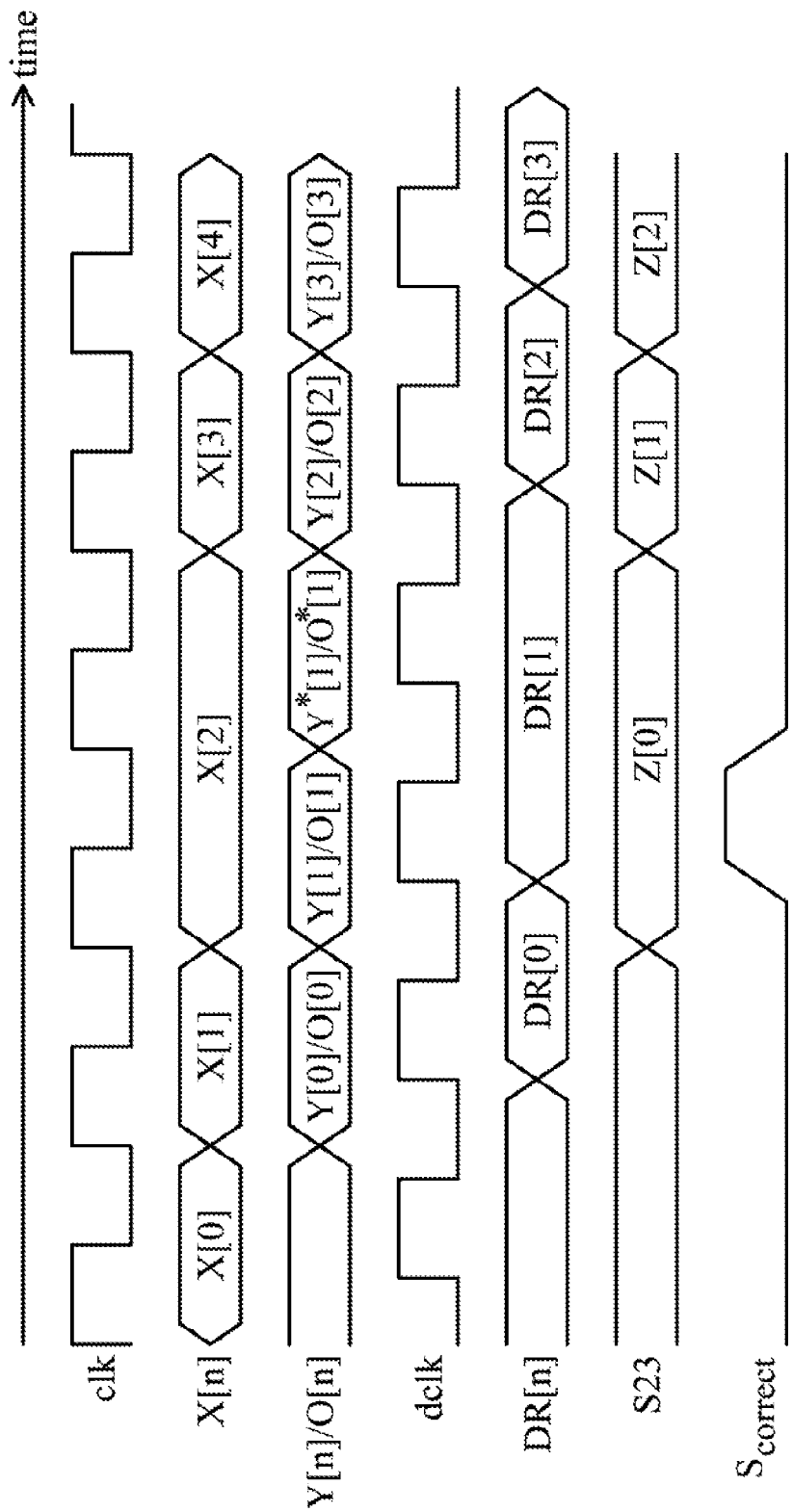
FIG. 3 shows a timing chart of the first clock signal, the second clock signal, the input data, the first data/output data of the output signal, the second data, the data of a back-end signal, and the control signal in FIG. 2.

FIG. 2 shows an exemplary embodiment of a detailed circuit of the processing device 2. FIG. 3 shows a timing chart of the first clock signal clk, the second clock signal dclk, the input data X[n], the first data Y[n]/output data O[n] of the output signal OUT, the second data DR[n], the data of a back-end signal S23, and the control signal $S_{correct}$ in FIG. 2. Referring to FIG. 2, the input unit 20 comprises a register 200. The register 22 receives data of a front-end signal S20 and latches the data of the front-end signal S20 according to the first clock signal clk to generate the input data X[n]. The control unit 22 comprises a multiplexer 210, registers 211 and 212, and a comparator 213. In the embodiment, the registers 211 and 212 are implemented by D-type flip-flops. The output unit 23 comprises a register 230. The register 230 receives the output signal OUT from the control unit 22 and latches the output signal OUT according to the first clocks signal clk to generate the back-end signal S23.

The detailed operation of the processing device 2 will be described by referring to FIGS. 2 and 3. In the embodiment, the registers 200 and 230 can be implemented by registers with enabling switching. Each of the registers 200 and 230 receives an input signal, an enabling signal (en), a clock signal and an output signal. When the enabling signal of the register remains at a certain level, such as a low level, the register latches the respective input signal and generates the output signal according to the latched input signal. Otherwise, the register does not latch the input signal and maintains the output signal on an original level. The control signal $S_{correct}$ is input to the registers 200 and 230 to serve as the respective enabling signals.

Referring to FIG. 2, the register 200 latches the data of the front-end signal S20 according to the first clock signal clk to generate the input data X[0]. The function unit 21 performs a specific operation to the input data X[0] to generate the result data R[0]. At this time, the multiplexer 210 receives the result data R[0] and selects the result data R[0] to serve as the output data and provides to the register 211 according to the control signal $S_{correct}$, for example, with a low level. The register 211 latches the result signal R[0] according to the first clock signal clk to generate the first data Y[0]. The result signal R[0] is also provided to the register 212. The register 212 latches the result data R[0] according to the second clock signal dclk to generate the second data DR[0] and provide to the multiplexer 210 and the comparator 213. The comparator 213 then compares the first data Y[0] and the second data DR[0] and generates the control signal $S_{correct}$ according to the comparison result. The control signal $S_{correct}$ is provided to the multiplexer 210. In the embodiment, the comparator 213 is implemented by an XOR gate 214. According to the logic operation of the XOR gate 214, when the first data Y[0] is not identical to the second data DR[0], the control signal $S_{correct}$ changes to, for example, a high level, and when the first data Y[0] is identical to the second data DR[0], the control signal $S_{correct}$ remains at the low level. Assume that the first data Y[0] is identical to the second data DR[0], in other words, the first data Y[0] is a correct operation result of the input data X[0]. In this case, the first data Y[0] serves as the output data O[0] of the output signal OUT. Thus, the comparator 213 generates the control signal $S_{correct}$ with the low level. The multiplexer 210 selects the next result data R[1] to serve as the output data and provide to the register 211. Moreover, the register 230 of the output unit 23 receives the output data O[0] of the output signal OUT and latches the output data O[0] according to the first clock signal clk to generate the data Z[0] of the back-end signal S23.

After the register 200 generates the input data X[0], the register 200 then latches the data of the front-end signal S20 according to the first clock signal clk to generate the next input data X[1]. The function unit 21 performs the above specific operation or another different specific operation to the input data X[1] to generate the result data R[1]. At this time, the multiplexer 210 receives the result data R[1] and selects the result data R[1] to serve as the output data and provide to the register 211 according to the control signal $S_{correct}$ with the low level, for example. The register 211 latches the result signal R[1] according to the first clock signal clk to generate the first data Y[1]. The result signal R[1] is also provided to the register 212. The register 212 latches the result data R[1] according to the second clock signal dclk to generate the second data DR[1] and provide to the multiplexer 210 and the comparator 213. The comparator 213 then compares the first data Y[1] and the second data DR[1] and generates the control signal $S_{correct}$ according to the comparison result. Assume that the first data Y[1] is not identical to the second data DR[1], in other words, the first data Y[1] is an incorrect operation result of the input data X[1]. Thus, the comparator 213 generates the control signal $S_{correct}$ with the high level. At this time, the registers 200 and 230 stop the latching operation and maintain their output data according to the control signal $S_{correct}$. The multiplexer 210 selects the second data DR[1] from the register 212 to serve as the output data and provide to the register 211 according to the control signal $S_{correct}$, for example, with the high level. The register 211 then latches the second data DR[1] according to the first clock signal clk to generate a corrected first data Y*[1] to correct the output signal OUT. At this time, the corrected first data Y*[1] is output to serve as the output data O*[1] of the output signal OUT, and the output data O*[1] is a correct operation result of the input data X[1]. Then, the register 230 of the output unit 23 receives the output data O*[1] of the output signal OUT and latches the output data O*[1] according to the first clock signal clk to generate the data Z[1] of the back-end signal S23.

In the embodiment of FIG. 2, whether the register 200 of the input unit 20 and the register 230 of the output unit 23 latch the data of the front-end signal S20 and the data of the output signal OUT respectively is determined according to the control signal $S_{correct}$. In the case where the first data Y[0] is identical to the second data DR[0], the register 200 continuously latches the data of the front-end signal S20 to generate the following input data X[2], and the function 21 performs the above specific operation to the input data X[1] to generate the result data R[1]. Moreover, at this time, the register 230 generates the data Z[0] of the back-end signal S23.

In the case where the first data Y[1] is not identical to the second data DR[1], the control signal $S_{correct}$ remains at a predefined level, for example could be a high level or a low level dependents on the implementation, so that the register 200 stops latching the front-end signal S20 and maintains its output at an original level, and the function unit 21 stops performing the specific operation. Moreover, the register 230 stops latching the output data O[1] with the incorrect operation result for preventing the register 230 from generating incorrect data of the back-end signal S23.

Figure 4:
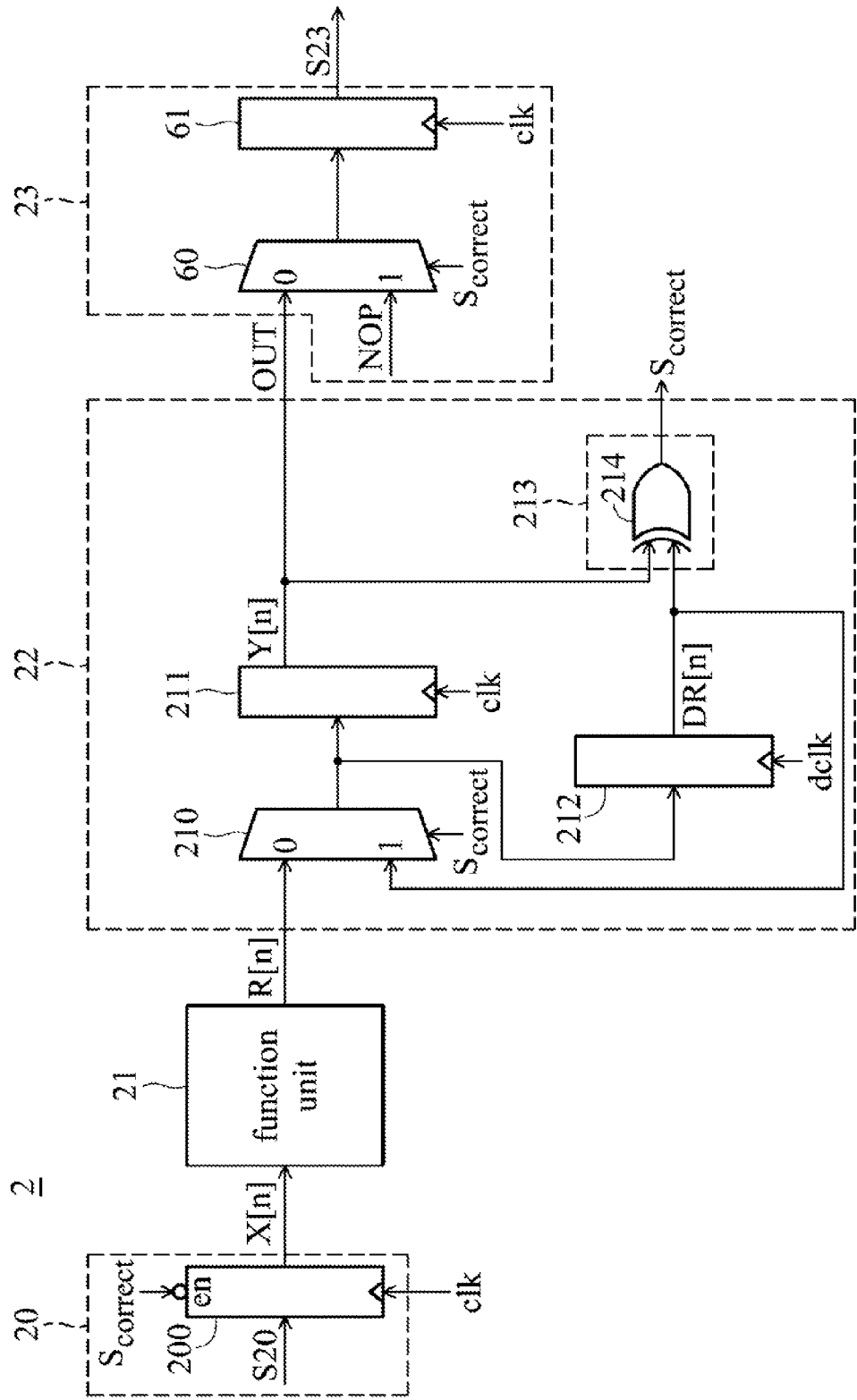
FIG. 4 shows another exemplary embodiment of a detailed circuit of the processing device in FIG. 1.
Figure 5:
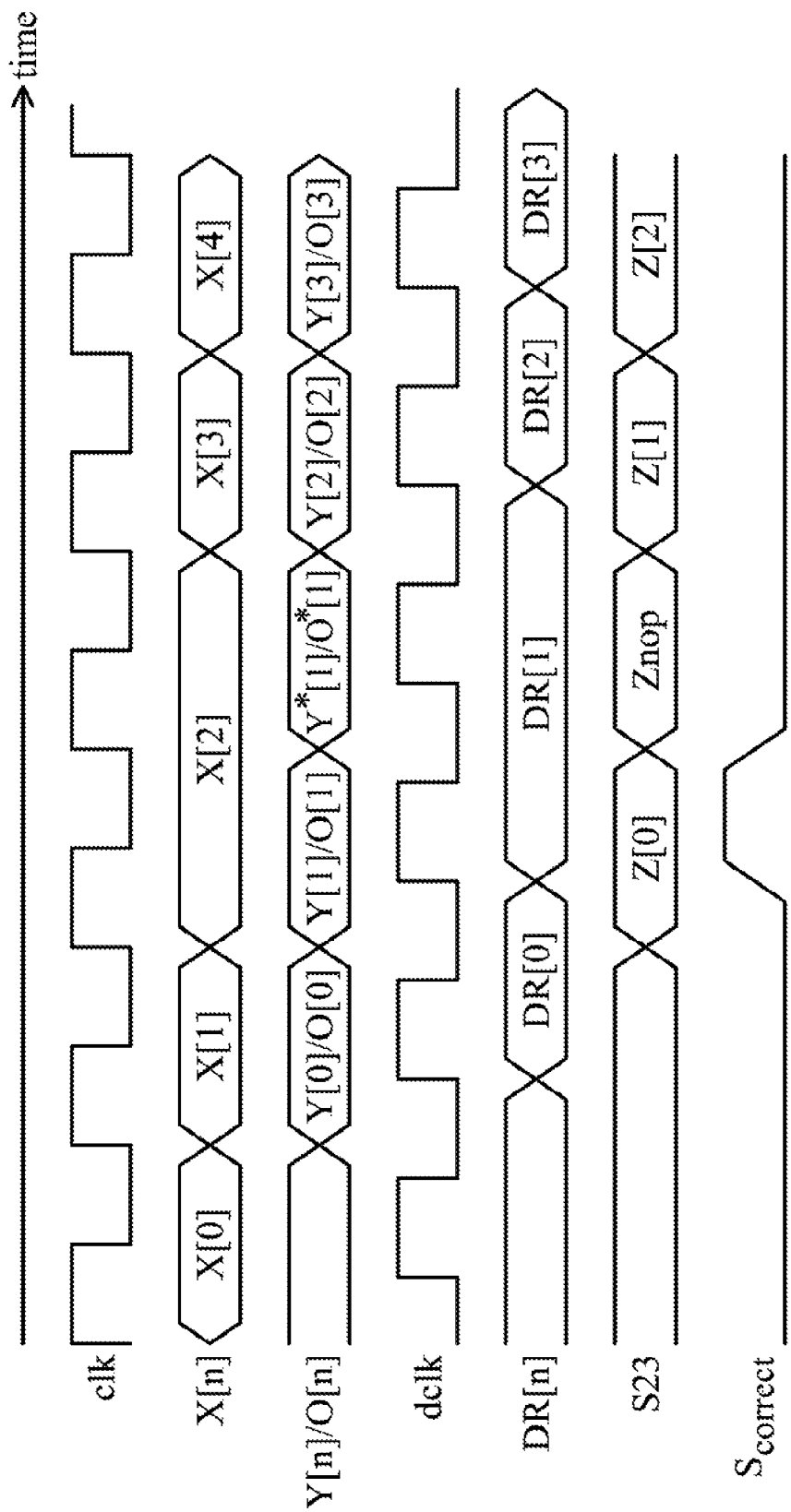
FIG. 5 shows a timing chart of the first clock signal, the second clock signal, the input data, the first data/output data of the output signal, the second data, the data of a back-end signal, and the control signal in FIG. 4.

FIG. 4 shows another exemplary embodiment of a processing device. The difference between the processing devices in FIGS. 2 and 4 is the output unit 23. FIG. 5 shows an exemplary embodiment of the processing device 2. FIG. 3 shows timing chart of the first clock signal clk, the second clock signal dclk, the input data X[n], the first data Y[n]/output data O[n] of the output signal OUT, the second data DR[n], the data of a back-end signal S23, and the control signal $S_{correct}$ in FIG. 4. Referring to FIGS. 4 and 5, the output unit 23 comprises a multiplexer 60 and a register 61. The multiplexer 60 receives the output signal OUT and a non-operation signal NOP which represents there is no operation data. The multiplexer 60 is controlled by the control signal $S_{correct}$. The register 61 performs a latching operation according to the first clock signal clk. In the case where the first data Y[0] is identical to the second data DR[0], the first data Y[0] serves as the output data O[0] of the output signal OUT, and the multiplexer 60 selects the output data O[0] of the output signal OUT according to the control signal $S_{correct}$ to output the output data O[0] to the register 61. The register 61 then latches the output data O[0] according to the first clocks signal clk to generate the data Z[0] of the back-end signal S23.

In the case where the first data Y[1] is not identical to the second data DR[1], the multiplexer 60 selects the non-operation signal NOP according to the control signal $S_{correct}$ to output the non-operation signal NOP to the register 61. At this time, the register 61 latches the data of the non-operation signal NOP according to the first clock signal clk to serve as the data Znop next to the data Z[0]. Then, when the corrected first data Y*[1] is output to serve as the output data O*[1] of the output signal OUT, the multiplexer 60 is switched to select the output data O*[1] of the output signal OUT according to the control signal $S_{correct}$ to output the output data O*[1] to the register 61. The register 61 then latches the output data O*[1] according to the first clock signal clk to serve as the data Z[1].

It will be apparent to those skilled in the art from consideration of the specification and practice of the disclosure disclosed here. The scope of the disclosure is intended to cover any variations, uses, or adaptations of the invention following the general principles thereof and including such departures from the disclosure as come within known or customary practice in the art. It is intended that the specification and examples be considered as exemplary only, with a true scope and spirit of the invention being indicated by the following claims and their equivalents.

What is claimed is:

1. A processing device comprising:
    a function unit for receiving input data and performing a specific operation to the input data to generate result data; and
    a control unit for receiving the result data and generating an output signal;
    wherein the control unit latches the result data according to a first clock signal to generate first data and latches the result data according to a second clock signal to generate second data;
    wherein the control unit compares the first data with the second data to generate a control signal;
    wherein when the control unit determines that the first data is not identical to the second data, the control unit provides the second data to serve as data of the output signal according to the control signal;
    wherein when the control unit determines that the first data is identical to the second data, the control unit confirms the first data to serve as the data of the output signal according to the control signal;
    wherein the second clock signal is delayed from the first clock signal by a predefined time period; and
    wherein the sum of the predefined time period and a cycle of the first clock signal is equal to or greater than the difference between the largest latency of the function unit and a cycle of the first clock signal.

2. The processing device as claimed in claim 1, wherein control unit comprises:
    a multiplexer for receiving the result data and selectively outputting the result data or the second data according to the control signal;
    a first register receiving data output from the multiplexer and latching the data output from the multiplexer according to the first clock signal to generate the first data;
    a second register for receiving the data output from the multiplexer, latching the result signal according to the second clock signal to generate the second data, and outputting the second data to the multiplexer; and
    a comparator for receiving and comparing the first data and the second data and generating the control signal according to the comparison result.

3. The processing device as claimed in claim 2, wherein when the comparator determines that the first data is not identical to the second data, the multiplexer outputs the second data to the first register according to the control signal, the first register latches the second data to correct the first data, and the latched second data serves as the data of the output signal.

4. The processing device as claimed in claim 2, wherein when the comparator determines that the first data is identical to the second data, the multiplexer outputs next result data from the function signal to the first register according to the control signal, and the first register latches the next result data according to the first clock signal.

5. The processing device as claimed in claim 2, wherein the first register and the second register are implemented D-type flip-flops.

6. The processing device as claimed in claim 2, wherein the comparator is implemented by an XOR gate.

7. The processing device as claimed in claim 2 further comprising:
    a third register for latching a front-end signal according to the first clock signal to generate the input data; and
    a fourth register for receiving the output signal and latching the data of the output signal to generate data of a back-end signal.

8. The processing device as claimed in claim 2 further comprising:
    a third register for latching a front-end signal according to the first clock signal to generate the input data;
    a multiplexer for receiving the output signal and a non-operation signal and selectively outputting the output signal or the non-operation signal according to the control signal; and a fourth register for latching the data of the signal or data of the non-operation signal according to the first clock signal to generate data of a back-end signal.

9. The processing device as claimed in claim 8, wherein when the control unit determines that the first data is not identical to the second data, the second data serves as the data of the output signal, the multiplexer sequentially outputs the non-operation signal and the data of the output signal to the fourth register according to the control signal, and the fourth register sequentially latches the data of the non-operation signal and the data of the output signal according to the first clock signal to serve as the data of the back-end signal.

10. The processing device as claimed in claim 8, wherein when the control unit determines that the first data is identical to the second data, the first data serves as the data of the output signal, the multiplexer outputs the data of the output signal to the fourth register according to the control signal, and the fourth register latches the data of the output signal according to the first clock signal to serve as the data of the back-end signal.

11. The processing device as claimed in claim 1 further comprising:
a first register for latching a front-end signal according to the first clock signal to generate the input data; and
a second register for receiving the output signal and latching the data of the output signal to generate data of a back-end signal.

12. The processing device as claimed in claim 11, wherein when the control unit determines that the first data is not identical to the second data, the control signal remains at a predefined level to enable the first register and the second register to stop the latching operation.

13. The processing device as claimed in claim 1 further comprising:
a first register for latching a front-end signal according to the first clock signal to generate the input data;
a multiplexer for receiving the output signal and a non-operation signal and selectively outputting the output signal or the non-operation signal according to the control signal; and
a second register for latching the data of the signal or data of the non-operation signal according to the first clock signal to generate data of a back-end signal.

14. The processing device as claimed in claim 13, wherein when the control unit determines that the first data is not identical to the second data, the second data serves as the data of the output signal, the multiplexer sequentially outputs the non-operation signal and the data of the output signal to the second register according to the control signal, and the second register sequentially latches the data of the non-operation signal and the data of the output signal according to the first clock signal for serving as the data of the back-end signal.

15. The processing device as claimed in claim 13, wherein when the control unit determines that the first data is identical to the second data, the first data serves as the data of the output signal, the multiplexer outputs the data of the output signal to the second register according to the control signal, and the second register latches the data of the output signal according to the first clock signal for serving as the data of the back-end signal.

* * * * *